United States Patent [19]

Suzuki et al.

[11] Patent Number: 4,783,857
[45] Date of Patent: Nov. 15, 1988

[54] MOISTURE PERMEABLE PROTECTOR FOR PROTECTING HANDS AND FINGERS

[75] Inventors: Takashi Suzuki; Noburu Nishikawa; Tomio Shimizu; Toshio Imai, all of Hyogo, Japan

[73] Assignee: Toyo Tire & Rubber Co., Ltd., Osaka, Japan

[21] Appl. No.: 926,016

[22] Filed: Oct. 31, 1986

[30] Foreign Application Priority Data

Nov. 1, 1985 [JP] Japan .................. 60-169652[U]

[51] Int. Cl.$^4$ .................. A41D 19/00; C08E 18/48
[52] U.S. Cl. ........................... 2/167; 2/168; 521/61; 528/272
[58] Field of Search ............... 2/167, 168; 521/61; 524/726; 525/440; 528/272

[56] References Cited

U.S. PATENT DOCUMENTS

| | | | |
|---|---|---|---|
| 2,871,218 | 1/1959 | Schollenberger | 528/272 X |
| 3,709,864 | 1/1973 | Loew et al. | 521/61 X |
| 3,879,764 | 4/1975 | Weber-Liel | 2/167 |
| 4,497,072 | 2/1985 | Watanabe | 2/167 X |
| 4,545,841 | 10/1985 | Jackrel | 2/167 X |
| 4,660,228 | 4/1987 | Ogawa et al. | 2/167 |
| 4,670,330 | 6/1987 | Ishiwata | 2/167 X |

FOREIGN PATENT DOCUMENTS

| | | | |
|---|---|---|---|
| 0859640 | 1/1961 | United Kingdom | 2/167 |
| 1273524 | 5/1972 | United Kingdom | 2/167 |

*Primary Examiner*—Louis K. Rimrodt
*Attorney, Agent, or Firm*—Koda and Androlia

[57] ABSTRACT

A moisture permeable protector such as gloves, fingerstalls, etc. for protecting hands and fingers at workshop, etc. utilizing a polyurethane film which has excellent moisture permeability. The film is made of polyurethane polymer having a polyoxyethylene content of 15-62% in a polyesterpolyol having a molecular weight of 3000 or less. The moisture permeability (g/m$^2$,24 hours) of the film is 1500 or higher per 45 micron thickness, and the water absorption swelling ratio is 30% or less.

2 Claims, 1 Drawing Sheet

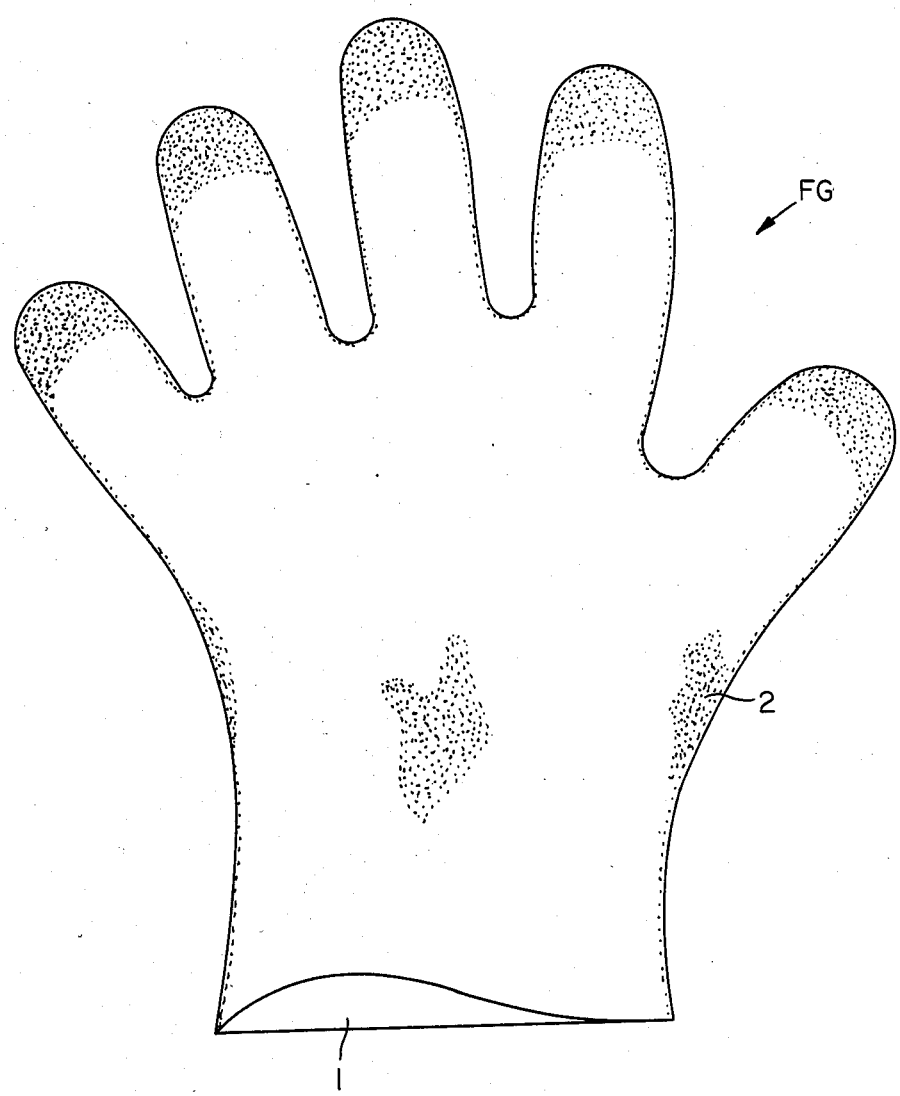

MOISTURE PERMEABLE PROTECTOR FOR PROTECTING HANDS AND FINGERS

BACKGROUND OF THE INVENTION

1. Field of the Invention

The present invention relates to a protector for hands and figures such as gloves, fingerstalls, etc. and more particularly to a protector having an excellent strength and endurance which is made of a polyurethane film which has a moisture permeability.

2. Prior Art

The conventional gloves and fingerstalls used in a workshop, etc. are made by moulding rubber compound or rubber latex. Other type of gloves are made of polyethylene. The drawback in these gloves and fingerstalls is that they do not have enough moisture permeability, and during their use, sweat and heat build up inside the gloves or fingerstalls. As a result, the fingers change color to white. Particularly noted as a drawback and discomfort in the fingerstalls is that it can easily slip off the fingers. Further, with a repeated use during work, a decrease in the physical properties caused by fatigue occurs, and the gloves and the fingerstalls are easily broken. Thus, they lack the strength and endurance.

Presently, there are several different methods for obtaining waterproof cloth which is permeable to gaseous water such as moisture but is not permeable to liquefied water such as rain drops. In one method, a highly crystalline tetrafluoride resin is spread on a base cloth to provide thereon a microporous film. In another method, very thin threads are woven which are several tens of times denser than ordinary textile so that spaces between the threads are smaller than rain drops but larger than moisture particles. Another method is to coat a hydrophilic polymer, which easily absorbs and releases water, on a base textile.

On the other hand, in a method know to give a hydrophilic property to polyurethane polymer, polyoxyethyleneglycol or block copolymer of polyoxyethylene and polyoxypropylene is used for the polyol component. It is also known that by lightly cross linking isocyanate terminal prepolymer obtained from polyethyleneoxyglycol, which has a molecular weight of 4,000-25,000, and organic diisocyanate with an equivalent water or organic polyamine, one can produce polyurethanehydrogel having a water absorption capability of several times larger than its own weight.

However, when polyoxyethyleneglycol is used singly or in combination with polyoxypropyleneglycol or when a copolymer of these substances is put in use, it is likely that the moisture permeability of the polymer due to the absorption of water becomes larger compared to the content of polyoxyethylene. Thus, a remarkable strength decrease is observed during water permeance.

SUMMARY OF THE INVENTION

In view of the above, the inventors of the present invention have noticed that it is necessary to select materials having excellent strength and endurance, and to increase the moisture permeability, and further to utilize materials having a low coefficient of swelling in water absorption.

The primary object of the present invention is to resolve the drawbacks of the prior art with a use of thin film material which has excellent moisture permeability.

In keeping with the principles of this invention, the above objects are accomplished by a unique structure for protectors such as gloves and fingerstalls for protecting hands and fingers made of a polyurethane film whose moisture permeability is 1500 or more per 45 microns thick and whose water absorption swelling ratio is 30% or less. The film is obtained from a polyurethane polymer which has a polyoxyethylene content of 15-62% in a polyesterpolyol having a molecular weight of 3000 or less.

BRIEF DESCRIPTION OF THE DRAWINGS

The FIGURE is a plan view of a moisture permeable protector in accordance with the present invention.

DETAILED DESCRIPTION OF THE INVENTION

The present invention uses a newly developed polyurethane polymer. This polyurethane polymer is obtainable in a following manner: Ethyleneglycol with a molecular weight of 200-600 is reacted in organic dicarboxylic acid singly or in dicalboxylic acid and ∈-caprolactone and/or short chain polyol, obtaining polyesterpolyol having a polyoxyethylene content of 17-70% and a molecular weight of 500-3000. Organic polyisocyanate is reacted on this polyester polyol in the presence of a chain elongation agent, producing a polyurethanepolymer having a polyoxyethylene content of 15-62%.

The low molecular weight polyethyleneglycol used in the manufacture of the polyesterpolyol is limited to one which has a molecular weight of 200-600. When the molecular weight is less than 200, the moisture permeability is too small. With 600 or more of molecular weight, the swelling ratio during water absorption increases, resulting in an obvious mechanical strength loss. Thus, the material is no longer suitable for use in manufacturing a rain coat, etc.

Also, as the organic dicarboxylic acid used in manufacturing polyesterpolyol, there is no limitation as long as an esterfication reaction to the polyethyleneglycol can be made. Most preferable materials are adipic acid or isophthalic acid used singly or in combination with dicalboxylic acid and -caprolactone and/or short chain polyol including 1,4-butanediol, ethyleneglycol, propyleneglycol, etc.

Of the polyesterpolyol obtained from the polyethyleneglycol and organic dicalboxylic acid, etc., as mentioned above, the polyol component which is a subject of the present invention is one having a polyoxyethylene content of 17-70 weight percent and a molecular weight of 500-3000. If the polyoxyethylene content of the polyesterpolyol is less than 17 weight percent, the moisture permeability is not sufficient enough. Also, if the molecular weight is less than 500, only a hard resin will be obtained. On the other hand, if the polyoxyethylene content is 70 weight percent or more, the moisture permeability becomes large, and if the molecular weight is 3000 or more, sufficient strength is not obtainable. Thus, the initial objective cannot be accomplished in either case.

As organic polyisocyanate utilized in order to polyurethanize the thus obtained particular polyesterpolyol, the followings are appropriate: hexamethylenediisocyanate (HDI), xylenediisocyanate (XDI), isophoronediisocyanate (IPDI), diisocyanate such as water added MDI. In case color changes are permissible in view of the use, presently known TDI, MDI, or slipshod-manufactured MDI, etc. can also be utilized. Also, an adduct body of polyol and isocyanate, prepolymer or organic polyisocyanate of more than three functional can be used when necessary. When prepolymer or adduct body which contains polyol in the isocyanate component is used, the influence thereof to the final polyoxyethylene content in the polyurethane polymer must be taken into consideration.

As the chain elongation agent used in the polyurethanization in the present invention, those presently known can be all employed. Examples are those in the diol group such as polyethyleneglycol; those in the diamine group such as 4,4-methylenebis-(2-chloroaniline), isophoronediamine, piperazine, and ethylene diamine; and amino alcohol such as N-methylethanolamine, mono-ethanolamine, etc.

Even in the polyurethane polymer obtained by the reaction of polyesterpolyol and organic polyisocyanate, which are specified above, in the presence of chain elongation agent, it is necessary to satisfy the range of polyoxyethylene content of 15–62 weight percent in the final polyurethane polymer. If the final polyoxyethylene content is 15 weight percent or less, sufficient moisture permeability cannot be obtained. If the final polyoxyethylene content is 62 weight percent or higher, the moisture permeability becomes larger. Thus, the endurance drop due to a decrease in the physical properties in a polymer layer which occurs during moisture permeance is not avoidable, causing problems in practical use.

Samples of Polyurethane Polymer

Samples 1–11

1. Manufacture of Polyester Polyol

In accordance with the ratios shown in Table 1, organic dicarboxylic acid; a combination of organic dicalboxylic acid and ε-caprolactone, or organic carboxylic acid and low molecular weight glycol; or a triple combination of organic dicalboxylic acid, ε-caprolactone, and low molecular weight glycol is reacted on polyethyleneglycol, and tetrabutyltitanate is added at a ratio of 0.001% against the mixed compositions. Then, the mixture was heated, while being stirred, at 200°–210° C. to perform an esterification reaction. Keeping the reaction going for 20 hours along with a pressure decrease and dehydration, eleven (11) polyesterpolyols labeled A through K were obtained. The polyoxyethylene content and molecular weight obtained by calculations using the mixing ratio mentioned above are as shown in Table 1.

TABLE 1

| Polyesterpolyol Labels | A | B | C | D | E | F | G | H | I | J | K |
|---|---|---|---|---|---|---|---|---|---|---|---|
| PEG (molecular weight 106) (pts. wt.) | — | — | — | — | — | — | — | — | 804.6 | 252.9 | — |
| PEG (molecular weight 200) (pts. wt.) | 1080 | — | — | 1830 | 1200 | 382.5 | — | — | — | — | — |
| PEG (molecular weight 400) (pts. wt.) | — | 480 | — | — | — | — | 480 | — | — | — | — |
| PEG (molecular weight 600) (pts. wt.) | — | — | 1140 | — | — | — | — | 2100 | — | — | 2400 |
| Adipic Acid (pts. wt.) | 642.4 | 29.2 | 131.4 | 1190 | 730 | 1330 | 1122.7 | 821.3 | 963.1 | 202.4 | 438 |
| ε-caprolactone (pts. wt.) | 236 | 1497.9 | 661.2 | 273.5 | 250 | 63.6 | — | — | 705.6 | 694.6 | — |
| 1, 4-Butanediol (pts. wt.) | — | — | — | — | — | — | 674.1 | 281.3 | — | — | — |
| Molecular Weight in Polyesterpolyol | 1800 | 2000 | 1900 | 3000 | 2000 | 546 | 2000 | 3000 | 2235 | 1100 | 2700 |
| Content Ratio of E.O. in Polyesterpolyol (%) | 60 | 24 | 60 | 61 | 60 | 70 | 24 | 70 | 36 | 23 | 89 |

[Note] In the Table
PEG means Polyethyleneglycol
E.O. means Polyoxethylene

2. Manufacture of Polyurethane Polymer

Using the polyesterpolyols A through K shown in Table 1, isocyanate terminal prepolymers were obtained in accordance with the compounding ratio in Table 2. Then, 30% in solid amount of dimethylformaldehyde were added to the prepolymers. Chain elongation agent was further added thereto, obtaining polyurethane polymers. The thus obtained liquid polyurethane polymers were poured onto glass plates, and 45 micron thick × 30 mm wide × 150 mm long films were produced with a use of film applicator. Datum lines 100 mm apart from each other were marked on the films, and the films were put in water at room temperature. After 24 hours, the films were taken out of water, and the distance (l) between the datum lines were measured immediately. The values obtained from the equation below were considered as water absorption swelling ratio:

Water absorption swelling ratio
$(\%) = (l - 100) \times 100/100$

Next, with a use of the 45 micron thick films obtained as mentioned above, the moisture permeabilities were measured in accordance with the method of JIS Z 0208 (Japanese Industrial Stndard Z 0208). The measurement result appears in Table 2.

TABLE 2

| SAMPLE NO. | 1 | 2 | 3 | 4 | 5 | 6 | 7 | 8 | 9 | 10 | 11 |
|---|---|---|---|---|---|---|---|---|---|---|---|
| Polyesterpolyol | A 100 | B 100 | C 100 | D 100 | E 100 | F 100 | G 100 | H 100 | I 100 | J 100 | K 100 |
| Organic Polyisocyanate | IPDI 24 | IPDI 22 | IPDI 23 | MDI 25 | MDI 38 | IPDI 81 | IPDI 22 | IPDI 11 | IPDI 20 | IPDI 40 | IPDI 16 |
| Chain Elongation Agent | IPDA 9 | IPDA 8 | IPDA 9 | MEA 5 | MEA 8 | IPDA 31 | BG 5 | BG 2 | IPDA 8 | IPDA 15 | IPDA 6 |
| Pecentage of E.O. in Final Polyurethane | 46 | 18 | 46 | 50 | 41 | 33 | 19 | 62 | 28 | 14 | 73 |
| Water Absorption Swelling Ratio (%) | 0 | 0 | 10 | 5 | 0 | 0 | 0 | 28 | 0 | 0 | 53 |
| Moisture Permeability | 2540 | 1900 | 2920 | 2750 | 2100 | 2020 | 1960 | 3380 | 1120 | 860 | 3450 |

TABLE 2-continued

| SAMPLE NO. | 1 | 2 | 3 | 4 | 5 | 6 | 7 | 8 | 9 | 10 | 11 |
|---|---|---|---|---|---|---|---|---|---|---|---|
| (g/m² · 24 hours) | | | | | | | | | | | |

[Note] In the Table
IPDI means Isophoronediisocyanate
MEA means N—methylethanolamine
E.O. means Polyoxyethylene
IPDA means Isophoronediamine
BG means 1, 4-butanediol

Comparative Sample 1

Using 7 parts by weight of isophoronediisocyanate and 6 parts by weight of isophoronediamine against 100 parts by weight of PR-3009 manufactured by Asahi Denka (which is a block copolymer polyetherpolyol of polyoxyethylene and polyoxypropylene), which has a molecular weight of 3000 and a polyoxyethylene content of 90%, the water absorption swelling ratio and the moisture permeability of the polyurethane polymer were measured in the same manner as the one in the Examples. The results were that the water absorption swelling ratio was 120% and the moisture permeability was 3500. The calculated polyoxyethylene content in the final polyurethane was 82%.

Comparative Sample 2

As a polyol component, the PR-3009 manufactured by Asahi Denka, which was used in the Comparative Sample 1, was again used. To 70 parts by weight of PR-3009, 30 parts by weight of poly ε-caprolactone was mixed. To this mixture, 17 parts by weight of isophoronediisocyanate and 6.5 pars by weight of isophoronediamine were added. Other than these, the water absorption swelling ratio and the moisture permeability were measured exactly the same way as in the Samples of the present invention. The results were that the water absorption swelling ratio was 40% and the moisture permeability was 2900. In this case, the polyoxyethylene content in the mixed polyol was 63%, and in the final polyurethane was 51%.

As is apparent from the comparison between the Samples and Comparative Samples, with both the polyoxyethylene content ratio in polyol and the polyoxyethylene content ratio in the final polyurethane brought into the ratios defined in the present invention, when the polyether and polyester were used together, a moisture permeability of 2900 which is above the objective level of the present invention was obtained, but a water absorption swelling ratio of 40% which was just above the objective level of 30% was obtained. The reason for this is assumed to be that the molecular weight of each of the polyoxyethylene of PR-3009 is as relatively large as 2700. This fact can be observed in the Examples 8 and 11.

A moisture permeable protectors for protecting hands and fingers according to the present invention are gloves and fingerstalls made of polyurethane film materials having excellent moisture permeability. This polyurethane polymer has a polyoxyethylene content of 15–62% in the polyesterpolyol with a molecular weight of 500–3000. As to moisture permeability, if the ratio thereof (g/m²•24 hours) is 1500 or more per 45 microns in thickness, the film is suitable for use. If it is very high like 3000 or more, the water absorption swelling ratio (%) is likely to increase.

The moisture permeability was measured in accordance with the method of JIS Z 0208 (Japanese Industrial Standard Z 0208). The water absorption swelling ratio was measured in the following manner: Datum lines were marked 100 mm apart from each other on a film of 45 microns in thickness, 30 mm in width, and 150 mm in length. The film was placed in water for 24 hours at room temperature. Then, the film was taken out of water, and the distance l between the datum lines were immediately measured. The change in the distance between the datum lines was regarded as the water absorption swelling ratio.

The moisture permeable protector in accordance with the present invention is, as mentioned above, made of a thin film. When used for working arctic gloves which prevent moistening, it is possible to cover heat insulating materials with the polyurethane film.

As detailed above, since a special polyurethane polymer film is used, the protector of this invention for protecting hands and fingers at a workshop has an excellent tenacity and strength together with a long lasting endurance. Further, the protector is impervious to water and has excellent steam permeability. Thus, neither sweat nor heat stays in the protector during use, and it can be used with comfort. Also, because of its low water absorption swelling ratio, decrease in moisture permeability due to water can be prevented.

Embodiment

A glove, whichis a moisture permeable protector in accordance with the present invention, and a glove on the market made of polyethylene were compared to each other. As a polyurethane polymer, the one of Sample 1 was used.

First, a reaction was made on polyethyleneglycol which has a molecular weight of 200, adipic acid, and ε-caprolactone, obtaining polyesterpolyol with a molecular weight of 1800. A chain elongation agent (isophorodiamine) was reacted on the isophoronediisocyanate in the presence of DMF solutions, obtaining a polyurethane polymer having a polyoxyethylene content of 46%. Then, a glove was made with a polyurethane film 1 made of this liquid polyurethane polymer. The glove FG thus made had a film with a thickness of 45 microns, a moisture permeability of 2540, and a water absorption swelling ratio of 0%. Shrivel patterns 2 for preventing slippage can be formed on the exterior of the glove when necessary.

Comparative Embodiment

The glove compared with was a polyethylene glove (emboss processed) being on the market. The thickness of the polyethylene film was 16 microns, the film portion was 4 microns, and the embossed portion was 12 microns. The moisture permeability was 32.6, and the water absorption swelling ratio was 0%. In this case, when the thickness of the film increases, the moisture permeability is decreased. When compared wth the Embodiment, the moisture permeability of this glove is very low.

As seen from the above, the moisture permeability is very much different between the glove of the present invention and the one compared with. The result of a wearing test of the gloves is as follows: With the comparative glove, uncomfortable sweating was observed 30 minutes after it was put on. Perspiration oozes between the glove and fingers, it becomes more slippery with an unpleasant feeling. Compared with this existing polyethylene glove on the market, in the glove of the present invention which is made of a polyurethane film having a low water absorption property and a high moisture permeability, no perspiration tendency was observed, and it was very comfortable to wear the glove.

As seen from the wearing test of the gloves, in the moisture permeable protector of the present invention, sweat and heat can emanate easily, and because of this, a comfortable working effect and sufficient endurance can be obtained.

We claim:

1. A moisture permeable protector for protecting hands and fingers consisting of a polyurethane thin film having excellent moisture permeability and a low water absorption swelling ratio which is made of polyurethane polymer having a polyoxyethylene content of 15-62%;

said polyurethane polymer being obtained by reacting a polyesterpolyol with an organic polyisocyanate in the presence of a chain elongation agent;

said polyesterpolyol having a polyoxyethylene content of 17-70% and a molecular weight of 500-3000 and being obtained by reacting polyethyleneglycol having a molecular weight of 200-600 with organic dicarboxylic acid along or dicarboxylic acid and $\epsilon$-caprolactone and/or short chain polyol.

2. A protector according to claim 1, wherein said film has a moisture permeability ($g/m^2$, 24 hours) of 1500 or higher and a water absorption swelling ratio of 30% or less per 45 micron thickness.

* * * * *